Oct. 24, 1961  W. FELDMAN ET AL  3,005,914
INFRARED DETECTING SYSTEM
Filed Sept. 24, 1957

William Feldman
Harry Frank Hicks, Jr.
INVENTORS
BY
ATTORNEYS

3,005,914
INFRARED DETECTING SYSTEM
William Feldman and Harry Frank Hicks, Jr., Rochester, N.Y., assignors, by mesne assignments, to the United States of America as represented by the Secretary of the Navy
Filed Sept. 24, 1957, Ser. No. 685,999
2 Claims. (Cl. 250—83.3)

This invention relates to a scanning system for infrared energy and more particularly to a new method of detecting the infrared energy focused on an infrared sensitive detecting element or bolometer by means of a fixed optical system.

It is known that the resistance of a bolometer varies in response to changes of temperature. Thus, when infrared energy from a head radiating body hereinafter referred to as a target, is focused upon a bolometer, the temperature of that portion of the bolometer is raised and the overall resistance of the bolometer is changed. Numerous methods have been proposed for obtaining an indication of the changes in the electrical properties of such bolometers when used as a single element or as one of several such elements in a suitable matrix. The method herein proposed comprises scanning the bolometer with an auxiliary infrared or other thermally dependent excitation source. As will be hereinafter explained the superposition of the images of the target and the auxiliary infrared source on the bolometer causes a variation in the voltage drop across the bolometer since the current through the bolometer is maintained at a substantially constant fixed value. Thus, the presence of a target image on the bolometer is determined when a variation in the voltage drop across the bolometer appears. The location of the target image on the bolometer and hence the position of the target in the field of the fixed optical system is indicated by the point in the scanning cycle of the auxiliary infrared source that the voltage variations across the bolometer occurs.

The primary object of the present invention is, therefore, to provide a system for detecting infrared energy.

Another object of the present invention is to provide a system for detecting and locating sources of infrared energy.

Still another object of the present invention is to provide an infrared energy detection system in which an auxiliary infrared energy source is utilized to scan the detecting element located in a fixed optical system and on which the infrared image of the target is focused whereby the voltage variation across the detecting element in response to the superposition of the images of the target and the auxiliary source can be noted.

Still other objects of the present invention will become readily apparent to those skilled in the art from the following description with reference to the drawing in which like characters denote like parts and wherein.

Figure 1:
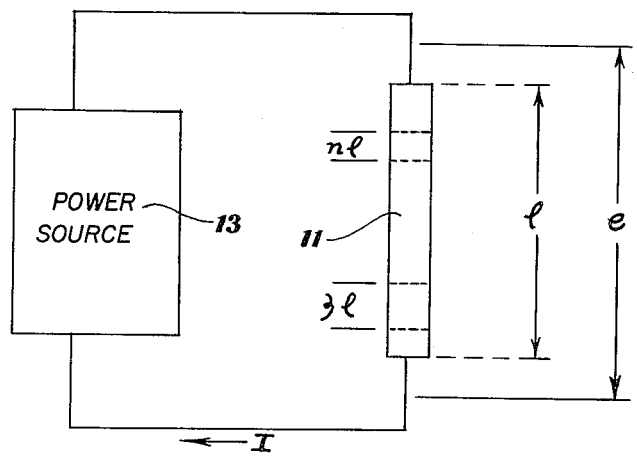
FIG. 1 is a schematic illustration of an electrical circuit including a typical bolometer.

The detecting element or bolometer 11 shown in FIG. 1 is polarized by means of a unidirectional current I supplied by the high impedance power source 13. The voltage $e$ developed across bolometer 11 is given by the basic formula:

$$e = IR$$

where R is the resistance of the bolometer 11. The variation in voltage which occurs across the bolometer as a result of variations in the resistance of the bolometer is given by the equation:

$$de = IdR + RdI \qquad (1)$$

In accordance with the present invention the unidirectional current from the high impedance source 13 is substantially constant so that in Equation 1:

$$dI = 0$$

and $$de = IdR \qquad (2)$$

It should be noted that if $dI \neq 0$ then the theory which follows is valid but the resulting signal is reduced. As stated in the text Electronic Processes in Ionic Crystals, second edition, Oxford Press, by N. F. Mott and R. W. Gurrey on page 158, the basic equation for the variation of resistance of a semi-conductor with temperature is given by the equation:

$$R = R_0 \epsilon^{B\left(\frac{1}{T} - \frac{1}{T_0}\right)} \qquad (3)$$

where R is the resistance of the conductor at temperature T, $R_0$ is the resistance of the conductor at temperature $T_0$, and B is a constant dependent upon the semi-conductor material and to a lesser extent upon the temperature range. Thus when an infrared image is focused on a portion of the bolometer 11, the resistance of that portion of the bolometer will change in accordance with the Equation 3 after the steady state has been obtained. The resistance of the bolometer 11 during the transient state and the duration of the transient state are determined by the thermal characteristics of the bolometer as well as its environment. For the purposes of simplifying the present discussion, we will consider the steady state characteristics only. However it should be understood that in actual practice of the invention, the result will be modified by the usual time dependent terms characterizing transient behavior. If the length of the bolometer 11 is considered as being $l$ and the width of the focused infrared image of the target on the bolometer 11 is equal to the width of the bolometer and of length $\eta l$, then differentiating Equation 3 with respect to T, one obtains the equation:

$$\frac{dR}{dT} = R_0 \epsilon^{B\left(\frac{1}{T} - \frac{1}{T_0}\right)} \left(\frac{-B}{T^2}\right)$$

For small changes in temperature, T and $T_0$ are essentially identical and $R_0$ will equal the value of R. Thus $$\frac{dR}{dT} = \frac{-BR}{T^2}$$

or $$dR = \alpha R dT$$

where $\alpha$ is the temperature coefficient of resistance and =

$$\frac{-B}{T^2}$$

Since we are interested only in that portion of the total resistance which is affected by the image $\eta l$ in length, then $$dR_t = \alpha R \eta dT \qquad (4)$$

where $dR_t$ is the change in resistance of the bolometer caused by the incidence of the infrared target image, and $dT$ is the change in temperature of that portion of the bolometer occupied by the infrared image of the target. If another infrared image from an auxiliary infrared source and having a width equal to that of the bolometer and a length of $\zeta l$, is caused to fall upon the bolometer 11, it will cause a corresponding change in the resistance of the bolometer. The magnitude of the change in resistance which occurs depends upon the physical position of the two infrared images on the bolometer. In the first instance, we will assume that the two images are separated, as indicated in FIG. 1, and affect different portions of the bolometer simultaneously. In the second instance, we will assume that the two images are superimposed and, therefore, affect the same portion of the bolometer. In the third instance, the two images would partially overlap each other on the bolometer.

The change in resistance caused by the incidence of the infrared image of length $\zeta l$ on bolometer 11 and at a point remote from the target image is $$dR_s = \alpha R \zeta dT' \qquad (5)$$

where $dR_s$ is the change in resistance of the bolometer caused by the incidence of the auxiliary source image and where $dT'$ is the change in temperature experienced by that portion of the bolometer 11 on which the second infrared image is incident. In the first instance, therefore;

$$de = I(dR_t + dR_s) = I(\alpha R \eta dT + \alpha R \zeta dT') \qquad (6)$$

In the second instance, the variation in voltage across the bolometer is determined in a manner similar to that demonstrated above except that it must be remembered that both $\alpha$ and $R$ are dependent upon temperature and hence the coincidence or superposition of the two images cannot be treated as a linear superposition. This fact is the basis of the present invention for it can be seen that if the first infrared image remains in a fixed position, then the voltage it produces will be constant, and if the second infrared image is caused to move along the bolometer, then the voltage produced by the second infrared image will be constant so long as the two images do not overlap (neglecting second order effects such as variation of sensitivity). When the two images are superimposed, the variation in voltage across the bolometer will be from Equations 2, 4 and 5:

$$de'' = I(\alpha'' R'' \eta dT + \alpha'' R'' \zeta dT') \qquad (7)$$

where the $''$ indicates the values of the associated quantities in the second instance. $\alpha''$ and $R''$ represent the first order expansion of $\alpha$ and $R$ respectively for small changes in temperature. Thus $$\alpha'' = \alpha + \frac{\partial \alpha}{\partial T}(dT + dT') \qquad (8)$$

and $$R'' = R + \frac{\partial R}{\partial T}(dT + dT') \qquad (9)$$

It will be assumed that the length of the overlapping portions of the two images is $\gamma l$. Substituting Equations 8 and 9 in Equation 7:

$$de'' = I\left[\alpha + \frac{\partial \alpha}{\partial t}(dT + dT')\right]$$

$$\left[R + \frac{\partial R}{\partial T}(dT + dT')\right][dT + dT']\gamma$$

or $$de'' = I\alpha R\gamma(dT + dT') + I\gamma(dT + dT')\left(R\frac{\partial \alpha}{\partial T} + \alpha\frac{\partial R}{\partial T}\right) +$$

2nd order terms $\qquad (10)$

The maximum expected variation of voltage across the bolometer 11 as the second infrared image moves completely across the bolometer 11 is given by the difference of voltages calculated in the second instance and in the first instance. Thus $$e_s = de'' - de = I(dT + dt')\gamma\left(R\frac{\partial \alpha}{\partial T} + \alpha\frac{\partial R}{\partial T}\right)$$

The magnitude of this term can be estimated by carrying out the indicated partial differentiations:

$$\frac{\partial \alpha}{\partial T} = \partial \frac{\left(-\frac{B}{T^2}\right)}{\partial T} = \frac{\partial B}{T^3}$$

Since from the definition of the temperature coefficient of resistance:

$$\frac{\partial R}{\partial T} = \alpha R$$

then $$e_s = I\gamma\left(\frac{2RB}{T^3} + \alpha^2 R\right)(dT + dT') \qquad (11)$$

or $$e_s = I\alpha R\gamma\left(-\frac{2}{T} + \alpha\right)(dT + dT')$$

Thus, as the second infrared image moves across the bolometer 11, the resistance change of the bolometer varies as a function of the temperature over the entire length of the bolometer. The temperature of the bolometer over its length is determined by the infrared energy that is incident upon it.

Figure 2:
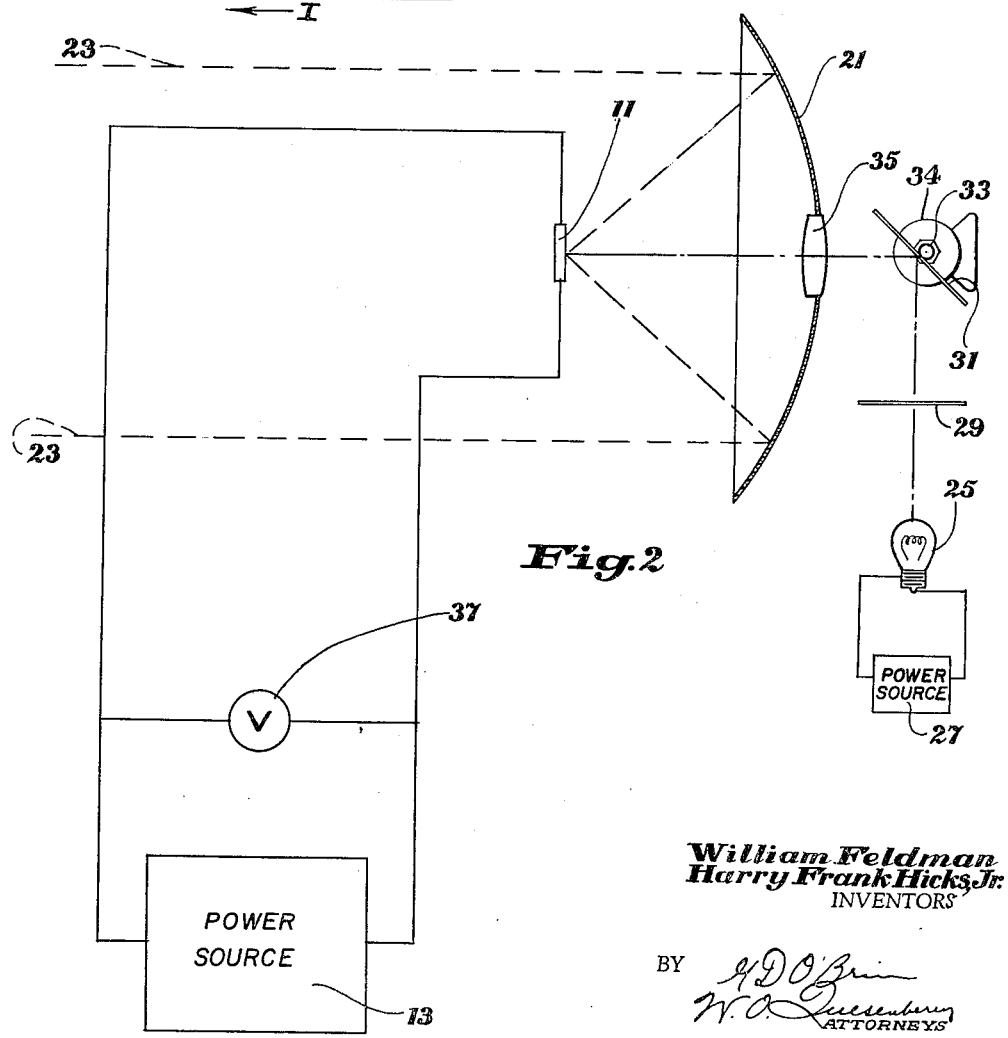
FIG. 2 is a schematic illustration of a detecting device incorporating the scanning system of the present invention.

In FIG. 2, we have illustrated a schematic arrangement utilizing the infrared detecting system of the present invention. A spherical mirror 21 is used to focus the infrared rays 23 from the target (not shown) onto the bolometer 11 which is arranged in the focal plane of mirror 21. An auxiliary infrared energy source 25 is mounted at some point remote from the bolometer 11 and is energized by a suitable power source 27. Infrared energy from source 25 passes through a suitable mask 29 and is directed by a mirror 31 which is oscillated about the shaft 33 by means of an oscillating electric motor 34, through the infrared transmitting and focusing lens 35 and onto the bolometer 11. The voltmeter 37 is connected across the bolometer to give an indication of the changes in voltage which appear across the bolometer. In operation, the image of the auxiliary infrared energy source 25 is caused to cyclically scan the bolometer 11 through the action of the oscillating mirror 31. So long as no target is within the field of mirror 21, a constant voltage will appear across the bolometer 11 as a result of the image of the auxiliary source 25 which is incident thereon. When a target appears within the field of the mirror 21, the image thereof is focused onto the bolometer 11 and a different voltage will appear on the voltmeter 37. This voltage also will remain constant except when the image of the auxiliary source 25 is partially superimposed or superimposed on the image of the target on the bolometer 11. By determining the point in the scanning cycle of the auxiliary source 25 at which the variations in voltage across the bolometer 11 are noted, the position of the image of the target on the bolometer will be fixed and the position of the target in the field of the mirror 21 will be known.

One of the principal advantages of the infrared detecting system of our invention is that scanning can occur without mechanical movement of either the bolometer 11 or the collecting mirror 21. Of course movement of the scanning beam from the auxiliary source 25 is required, as by means of the oscillating mirror 31, but because the scanning beam can be very intense, the movements required are small and readily controlled.

While only one embodiment of the present invention has been shown and described, it is realized that many modifications and variations are possible and will be readily recognized by those skilled in the art from the foregoing description which is intended, therefore, to be illustrative only and the scope of the invention is defined in the appended claims.

Having now particularly described our invention what we desire to secure by Letters Patent of the United States and what we claim is:

1. A device for detecting infrared energy comprising a photoconductive infrared sensitive detecting element, means for focusing infrared energy from a target onto said detecting element, an auxiliary source of infrared energy, means for focusing the infrared energy from said auxiliary source onto said detecting element and cyclically scanning said detecting element therewith, means for passing a unidirectional polarizing current of a constant magnitude through said detecting element, and means for sensing variations in voltage across said detecting element which occur as a result of the superposition of images of said target and said auxiliary source on said detecting element.

2. A method of detecting the presence of an energy radiating target in a predetermined field comprising forming an image of said field on and within the area of a photoconductive element sensitive to the energy radiating from said target, forming on and moving along said element within the area of said image, a constant intensity spot of radiant energy which together with said image of said field has a predetermined effect on the resistance of said element, and continuously measuring the resistance of said element to determine the presence of a target in said predetermined field by the variation in the resistance of said element resulting from the superpositioning of said spot and the image of said target on said element.

References Cited in the file of this patent

UNITED STATES PATENTS

| | | |
|---|---|---|
| 2,654,853 | Weimer | Oct. 6, 1953 |
| 2,715,364 | Buck et al. | Aug. 16, 1955 |
| 2,721,275 | Jackson | Oct. 18, 1955 |
| 2,740,901 | Graham | Apr. 3, 1956 |
| 2,825,021 | Friend | Feb. 25, 1958 |
| 2,879,424 | Garbuny et al. | Mar. 24, 1959 |